United States Patent [19]

Tanis

[11] Patent Number: 4,736,833
[45] Date of Patent: Apr. 12, 1988

[54] COMBINE FEEDER CONVEYOR DRAG BAR MOUNTING MECHANISM

[75] Inventor: Dale R. Tanis, Naperville, Ill.

[73] Assignee: J. I. Case Company, Racine, Wis.

[21] Appl. No.: 830,102

[22] Filed: Apr. 24, 1986

[51] Int. Cl.$^4$ ............................................. B65G 19/00
[52] U.S. Cl. ................................... 198/719; 198/732; 403/146
[58] Field of Search ............. 198/732, 520, 731, 719, 198/712, 802, 851, 697, 733; 130/27 AB; 56/14.5, 14.6; 403/146; 414/514, 515, 516

[56] References Cited

U.S. PATENT DOCUMENTS

| | | | |
|---|---|---|---|
| 474,975 | 5/1892 | Selleck | 198/732 X |
| 1,518,430 | 5/1923 | Hurst et al. | 198/731 |
| 2,381,519 | 8/1945 | Russell | 198/732 |
| 2,646,158 | 7/1953 | Vodoz | 198/733 X |
| 2,676,696 | 4/1954 | Gerhartz | 198/732 |
| 3,329,255 | 7/1967 | Dulieu | 198/732 |
| 3,927,759 | 12/1975 | Hyler et al. | 198/719 |
| 4,553,663 | 11/1985 | Johnson | 198/731 |
| 4,662,509 | 5/1987 | Kaak | 198/851 X |

Primary Examiner—L. J. Paperner
Assistant Examiner—Cheryl L. Gastineau
Attorney, Agent, or Firm—Dressler, Goldsmith, Shore, Sutker & Milnamow, Ltd.

[57] ABSTRACT

An anti-fatigue mounting mechanism, which is used to join a drag bar to an endless chain in a combine feeder mechanism, is disclosed. A combine feeder mechanism typically includes a feeder housing, a feeder drum rotatably carried within the housing, and endless chains rotatably carried in the housing and used to rotate the drum about an axis of rotation. A spaced pair of the chains is typically mounted on end portions of the drum, and a third chain is preferably mounted therebetween. One of the embodiments of the present invention pivotally joins a drag bar lateral end portion to one of the end-mounted chains. The other embodiment pivotally joins facing drag bar end portions to each other and to the chain disposed therebetween.

5 Claims, 2 Drawing Sheets

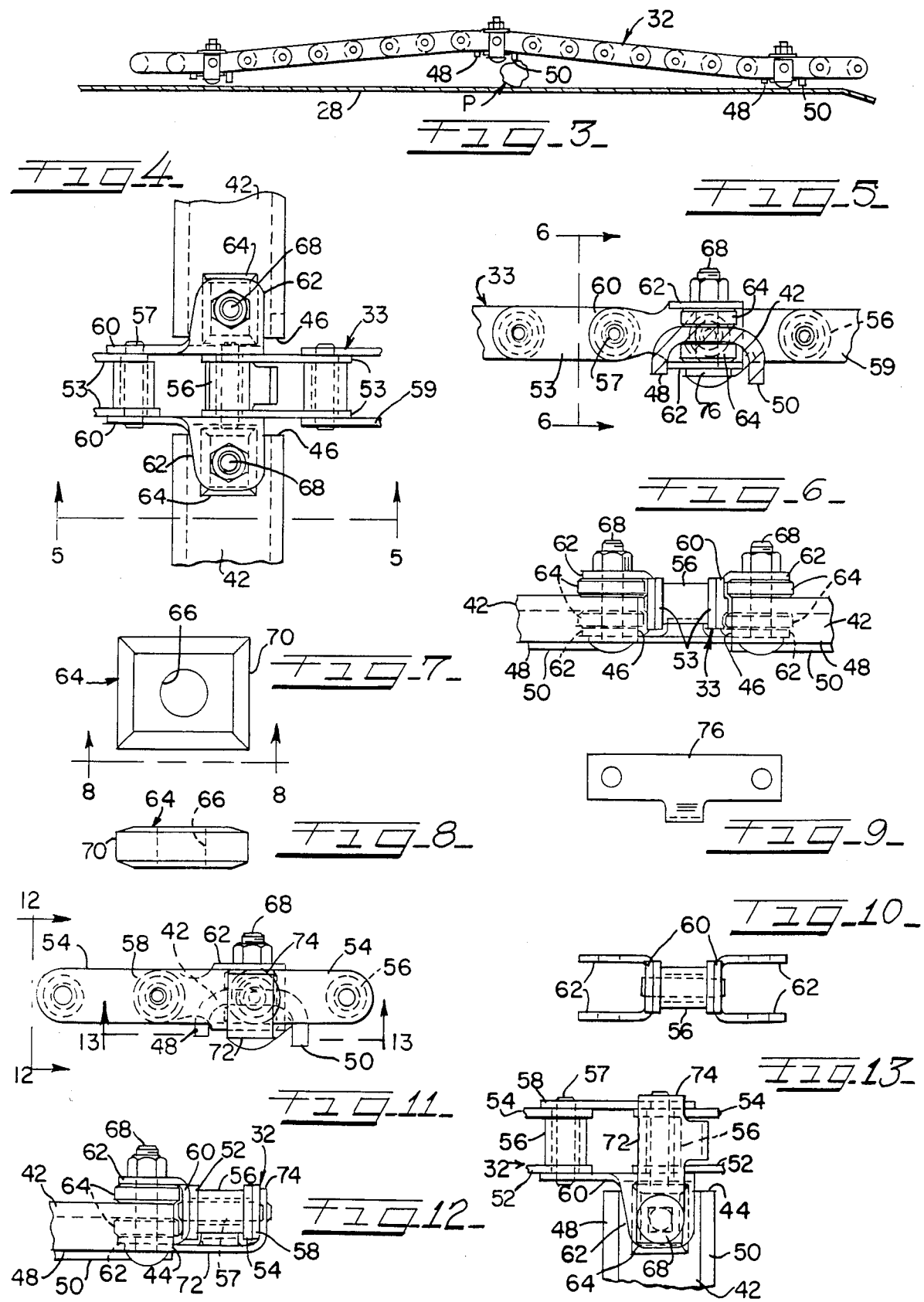

COMBINE FEEDER CONVEYOR DRAG BAR MOUNTING MECHANISM

TECHNICAL FIELD OF THE INVENTION

The present invention is directed to an anti-fatigue mounting mechanism for pivotally connecting an end portion of an elongated drag bar or so-called "slat" of a combine feeder conveyor to an associated drive chain. In particular, the mechanism of the present invention is used to join a drag bar end portion to an endless chain rotatably carried in a combine feeder housing. The mechanism substantially reduces the likelihood of fatigue failure occurring at the region or joint where the bar is connected to the chain.

BACKGROUND OF THE INVENTION

Combines employ feeder mechanisms to transfer crop material from the combine crop-harvesting portion or region to the combine crop-threshing portion or region. Combine feeder mechanisms typically include a feeder housing and a chain-driven feeder drum rotatably mounted in the housing. Elongated drag bars (i.e., so-called "slats"), fixedly connected to the feeder mechanism chains, are employed to move the crop material through the feeder mechanism to the combine crop-threshing region.

For a variety of reasons, from time to time, drag bars break free from the chains to which they are mounted. That is, either drag bars or chains or both fatigue and fail at the region or along the joint where conventionally connected together. Such fatigue generally results in undesirable combine "down time", and can result in severe damage to combine feeder drum elements.

One source of the fatigue problem has been traced to the relatively inflexible construction employed for conventionally connecting combine feeder mechanism chains and drag bars together. Another source of the fatigue problem has been traced to relatively high localized stresses or loads which are from time to time generated in the connecting structures where the drag bars are joined to the chains. For example, relatively high localized stresses or loads are generated when chains and/or drag bars override relatively large particles of crop material or foreign matter carried along with the crop material and introduced into the combine feeder mechanism.

SUMMARY OF THE INVENTION

The present invention is an anti-fatigue mounting mechanism for providing a relatively flexible connection between drag bars of a combine feeder mechanism and the mechanism's drive chains. By the present construction, fatigue failure is desirably abated, with the arrangement better suited to absorb relatively high loads as may be generated attendant to in-feed of a relatively large particle of crop material or foreign matter.

A combine feeder mechanism typically includes a feeder housing, a feeder drum rotatably carried within the housing, and endless chains rotatably carried in the housing and used to rotate the drum about an axis of rotation. A spaced pair of the chains is typically mounted on respective end portions of the drum, and a third chain is preferably mounted therebetween.

In accordance with a first embodiment of the mounting mechanism of the present invention, an end connector, pivotally connects or joins one of the pair of chains to a drag bar end portion. The first embodiment comprises an attaching chain link having a U-shaped configuration including a pair of spaced integral ears, extending laterally of the chain end portions pivotally joined together thereby. A spaced pair of elastomeric inserts or so-called "low-friction" spacers which straddle a drag bar end portion are disposed between the ears, and the elastomeric spacers and drag bar end portions are pivotally connected to each other and to the ears by conventional threaded fastener means.

The first embodiment includes a side bar cross tie pivotally mounted on one of the ears by the threaded fastener. The side bar cross tie has an integral side wall overlying the chain outer lateral side and pivotally connected thereto.

The second embodiment of the mounting mechanism of the present invention, and intermediate connector, comprises the above-mentioned attaching chain link and elastomeric inserts or spacers, and includes a second embodiment of the side bar cross tie. The second embodiment of the mounting mechanism is used to pivotally connect or join together facing end portions of a longitudinally aligned pair of drag bars to each other and to a chain disposed therebetween. In the second embodiment of the present invention, a spaced pair of attaching chain links are pivotally connected to the intermediate chain in a manner so as to pivotally join together the facing end portions of the pair of drag bars. The second embodiment of the side bar cross tie is pivotally connected by conventional threaded fastener means to one of the ears of each one of the pair of attaching chain links.

BRIEF DESCRIPTION OF THE DRAWINGS

FIG. 4 is a fragmented plan view of one embodiment of the present invention, on an enlarged scale relative to FIGS. 1-3;

FIG. 5 is a side view taken from the plane 5—5 in FIG. 4;

FIG. 6 is a cross-sectional view taken along the plane 6—6 in FIG. 5;

FIG. 7 is a plan view of a preferred embodiment of the elastomeric spacer or insert element of the present invention, on an enlarged scale relative to FIGS. 1-6;

FIG. 8 is a side view taken from the plane 8—8 in FIG. 7;

FIG. 9 is a plan view of a side bar cross tie element of the present invention, shown in FIGS. 4-6;

FIG. 10 is a view showing a spaced pair of the attaching chain link elements of the present invention, shown in FIGS. 4-6;

FIG. 11 is a side view of another embodiment of the anti-fatigue mounting mechanism of the present invention, on an enlarged scale relative to FIGS. 1-3;

FIG. 12 is a cross-sectional view taken from the plane 12—12 in FIG. 11;

FIG. 13 is a plan view taken along the plane 13—13 in FIG. 11; and

FIG. 14 is a fragmented detail view, on an enlarged scale relative to FIG. 12.

DETAILED DESCRIPTION OF PREFERRED EMBODIMENTS

Figure 1:
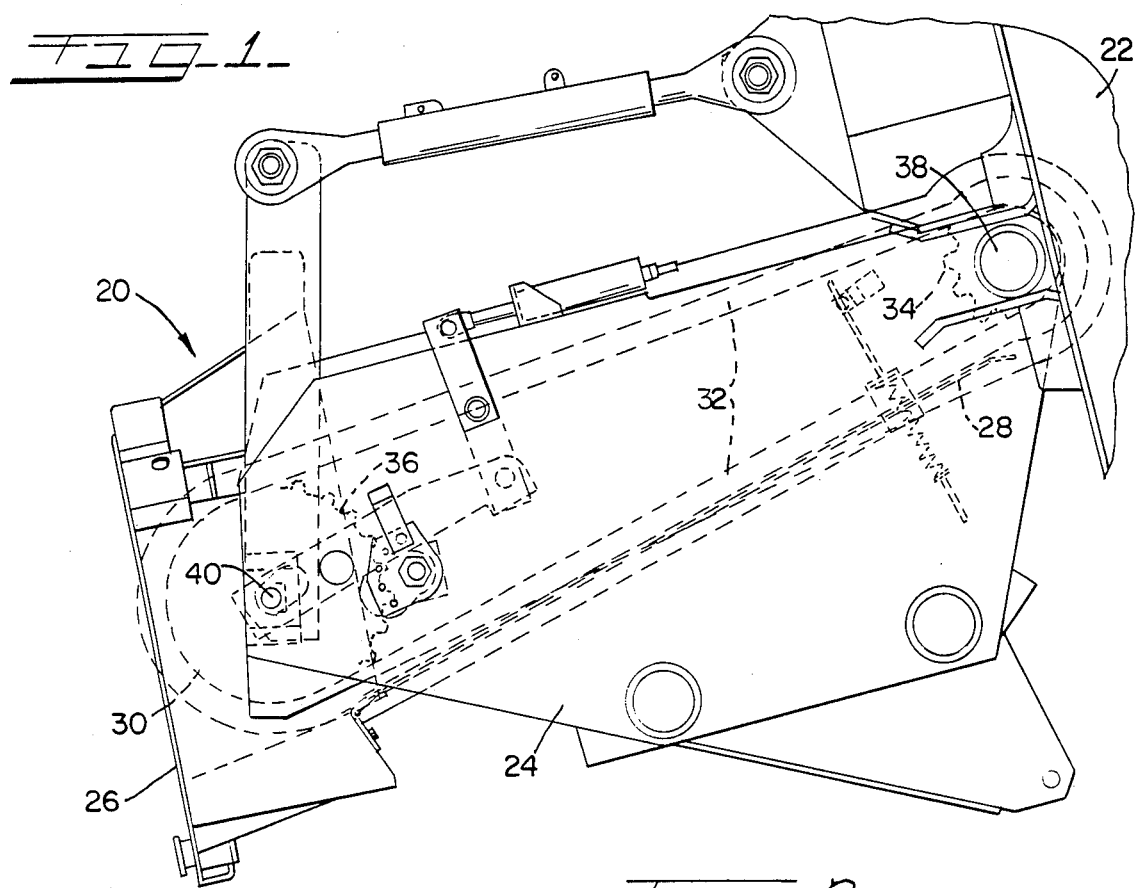
FIG. 1 is a side elevational view of a combine feeder mechanism incorporating the anti-fatigue mounting mechanism of the present invention.

While the present invention is susceptible to embodiment in various forms, there is shown in the drawings and hereinafter described in detail two presently preferred embodiments of the present invention, with the understanding that the present disclosure is to be considered as an exemplification of the invention without limitation to the specific embodiments illustrated.

Referring initially to FIG. 1, there is shown a combine feeder mechanism 20, which is pivotally connected to a forward portion of a combine 22. The feeder mechanism 20 includes a feeder housing 24 having an inlet 26 and a floor 28, and a feeder drum 30 rotatably mounted in the feeder housing 24 adjacent the inlet 26.

Figure 2:
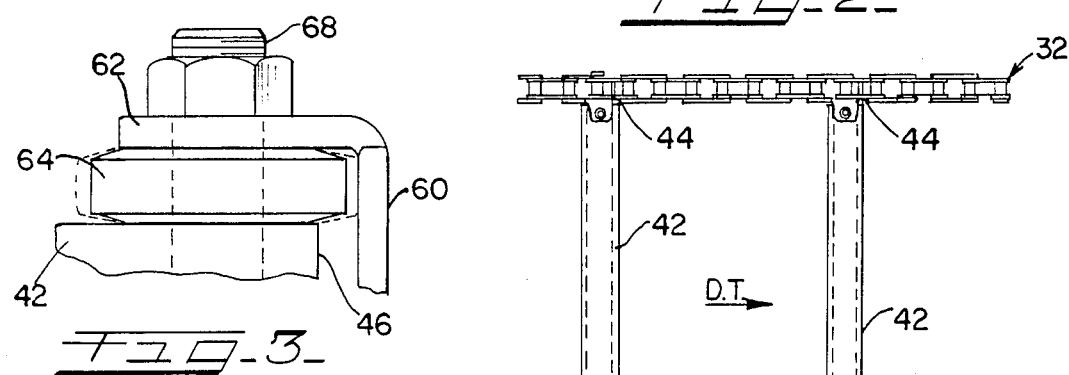
FIG. 2 is a fragmented plan view of several combine feeder mechanism elements which incorporate the anti-fatigue mounting mechanism of the present invention, the elements of FIG. 2 being depicted on an enlarged scale relative to FIG. 1.

The drum 30 is driven by endless chains 32 and 33, rotatably mounted in the housing 24. That is, preferably, a spaced pair of end-mounted chains 32, and a chain 33 spaced therebetween are used to drive drum 30, as shown in FIG. 2. In certain applications, the intermediate chain 33 will not be required.

Each chain 32 and 33 is mounted on a respective drive sprocket 34 which drives a respective sprocket gear 36 fixed to the exterior circumferential surface of the drum 30 (FIG. 1). Drive shaft 38, driven by conventional means (not shown), causes the chain 32 to rotate drum 30 about drum shaft 40.

The anti-fatigue mounting mechanism is used to pivotally join or connect a plurality of elongated drag bars 42 to the chains 32 and/or 33 as follows. The chain 32 and drag bars (or so-called "slats") 42, are together caused to override the drum 30 by rotation of drive shaft 38. That is, the drag bars 42 move harvested crop material from the inlet 26 and across the feeder housing floor 28, and thereafter the drag bars 42 cause the harvested crop material to be introduced into the combine threshing means (not shown). Thus, when viewed from above the feeder housing floor 28, the direction of travel D.T. of the chain-mounted drag bars 42 is toward the drive shaft 38.

Referring initially to FIG. 2 it will be seen that each drag bar 42 has a lateral end portion 44 pivotally connected to one end-mounted chain 32. When an intermediate chain is also used, as in the illustrated embodiment, an inner end portion 46 of each respective drag bar 42 is pivotally connected to the intermediate endless chain 33.

Figure 3:
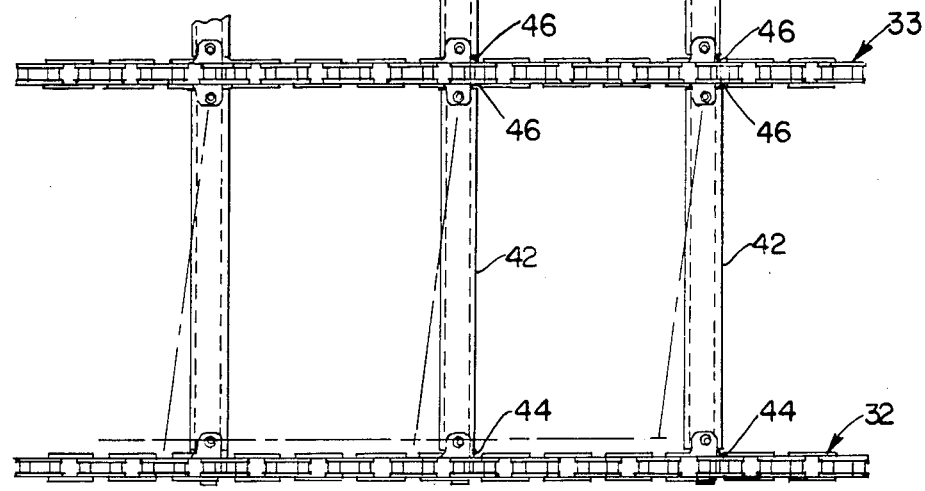
FIG. 3 is a fragmented side view of the chain and drag bars shown in FIG. 2, on an enlarged scale relative to FIGS. 1-2.

Referring now to FIGS. 11-14, one embodiment of the present invention, a so-called "end connection" mechanism, will be discussed. Each drag bar 42 is seen to be U-shaped in cross section (FIG. 11) and to have an upper leg 48 and a lower leg 50 spaced relatively closer to the feeder housing floor 28 than the upper leg 48 (FIG. 3). Each end-mounted endless chain 32 may comprise conventional roller chain, and includes an inner lateral side link plate 52, an outer lateral side link plate 54, and a roller 56 rotatably carried therebetween. That is, roller 56 is rotatably mounted on conventional means, such as rivet or pin 57. A second outer lateral side link plate 58 pivotally connects or joins together an adjacent pair of lateral side link plates 54 (FIG. 13).

The intermediate endless chain 33, shown in FIGS. 4-6 and described in greater detail below, similarly is seen to include a first spaced pair of lateral side link plates 53 which are sandwiched between and pivotally connected to a second spaced pair of lateral side link plate 59 (FIG. 4). A pin 57 having a roller 56 thereon extends through side link plates 53 and 59.

Referring again to FIGS. 11-14, an attaching chain link 60, having a U-shaped configuration including a pair of integral ears 62 disposed transverse to the chain 32 (FIG. 12), also pivotally connects or joins together an adjacent pair of lateral side link plates 54. That is, a side link plate 58, and an attaching chain link 60 spaced opposite therefrom, pivotally join end portions of the chain 32 together (FIG. 13). In particular, the link 60 is pivotally connected to the inner lateral side link plates 52 of adjacent rollers 56 in the first embodiment (FIG. 13); in contrast, a spaced pair of the links 60 pivotally connect adjacent rollers 56 in like a manner in the second disclosed embodiment (FIG. 4).

In the first embodiment, the U-shaped attaching chain link 60 is pivotally connected only to the inner lateral side of the end-mounted chain 32 (FIGS. 12 and 13); whereas in the second embodiment, spaced pairs of the U-shaped links 60 are pivotally connected to opposite sides of the intermediate chain 33 (FIGS. 4, 6 and 10). As briefly mentioned above, the link 60 has a pair of integral ears 62 and is generally U-shaped in cross section (FIG. 12), which ears 62 are disposed laterally of the direction of movement of the chain 32 (FIG. 12) and the chain 33 (FIGS. 6 and 10).

An elastomeric shock-absorbing and load-distributing spacer or insert element 64 of the present invention will now be discussed. The elastomeric element or member 64 (FIGS. 7 and 8) functions as a cushioned insert or spacer for resiliently absorbing and cushioningly distributing load within the region, or at the joint, where each drag bar 42 is pivotally connected to a respective one of the U-shaped links 60. The elastomeric member 64 includes a bore or aperture 66 through which conventional threaded fastener means 68 can be disposed (FIG. 12) for pivotally connecting the drag bar 42 and a pair of spaced elastomeric members 64 between the U-shaped ears 62 of a link 60 (FIGS. 6 and 12). Preferably, the spaced pair of elastomeric members 64 straddle the drag bar 42, and are in snug engagement with the drag bar 42 and the ears 62 (FIGS. 5 and 12).

The elastomeric member 64 preferably includes tapered or beveled marginal edge portions 70, each of which serves as a wedge, to allow the elastomeric member 64 to readily be urged between the drag bar 42 and an associated ear 62. In particular, when a load is imposed either by drag bar 42 upon ear 62 or by ear 62 upon drag bar 42, the elastomeric member or pad 64 is caused to resiliently deform slightly, as shown in phantom in FIG. 14, for cushioningly distributing load between drag bar 42 and ear 62. In other words, as shown in phantom in FIG. 14, the sides of the elastomeric pad 64 are displaced radially outwardly from threaded fastener 68 when a load, urging bar end portion 46 and ear 62 together, is applied.

It has been observed that the present invention has accounted for a substantial reduction of failure at the joint where a drag bar 42 is connected to a chain 32 or 33 (as discussed above), as compared to the conventional rigid or fixed connection method of connecting the drag bar 42 to either of the chains 32 or 33. Further, because the drag bar 42 is pivotally connected to either of the chains 32 or 33 by the U-shaped ears 62 of chain link 60, the chain 32 or 33 now can more readily override an obstruction or foreign matter particle "P" (FIG. 3) and can even temporarily distort into a parallelogram (as is shown in phantom in FIG. 2) with substantially no failure occurring at the juncture where the drag bars 42 are pivotally connected to either of the chains 32 or 33.

The elastomeric shock-absorbing and load-distributing member or pad 64 is made of suitable conventional elastomeric material. Such elastomeric materials can include natural rubber, styrene-butadiene rubber, acrylate, a variety of butyl elastomeric materials, silicone, and the like.

The first embodiment of the anti-fatigue mounting mechanism of the present invention further includes a side bar cross tie 72, pivotally mounted on one of the ears 62, as by the threaded fastener means 68 (FIGS. 12 and 13). The side bar cross tie 72 includes an integral side wall 74 overlying the outer lateral side of end mounted chain 32 and pivotally connected thereto (FIGS. 11-13). The side bar cross tie 72 of the first embodiment serves to substantially reduce the possibility of the drag bar 42 (to which it is attached) being torn away from the end-mounted chain 32 by a force imposed lateral to the chain 32.

The second embodiment of the anti-fatigue mounting mechanism of the present invention is an intermediate connection mechanism. That is, the second embodiment is used to pivotally connect or join facing drag bar inner end portions 46 together, and to the intermediate endless chain 33 disposed therebetween (FIGS. 4-6).

The second embodiment of the anti-fatigue mounting mechanism of the present invention comprises, as noted, a spaced pair of links 60, pivotally connected to opposite lateral sides of intermediate chain 33. The second embodiment includes two spaced pairs of the elastomeric inserts or pads 64. One pair of pads 64 straddles a first drag bar end portion 46, and a second pair of pads 64 straddles a second drag bar end portion 46 which faces the first end portion 46 (FIG. 4). Each drag bar end portion 46 and pair of pads 64 is sandwiched between the ears 62 of a respective one of the above-mentioned links 60 (FIG. 4), and is pivotally connected or joined thereto by a respective one of the threaded fastener means 68 (FIG. 5). The second embodiment further includes a side bar cross tie 76 which pivotally connects or joins facing drag bar end portions together using the above-mentioned conventional threaded fastener means 68 (FIG. 6).

For the sake of brevity, the various elements of the second embodiment (discussed above in connection with the first embodiment) need not now be further described. As between the first and second embodiments, however, it will be noted that a spaced pair of the links 60 are used to pivotally connect together adjacent end portions of the intermediate chain 33, in the second embodiment (FIG. 4). In other words, links 60 pivotally connect one spaced pair of lateral side link plates 53 to another spaced pair of lateral side link plates 53 (FIG. 4). In the first embodiment, however, a single link 60 co-acts with the outer lateral plate 58 to pivotally join end portions of chain 32 together.

For each of the embodiments, the above-described flexible joining mechanism of the present invention allows a substantial degree of relative movement to take place between a drag bar 42 and a link 60 pivotally connected thereto, without fatigue damage occurring. For example, the elastomeric inserts or spacers 64 distribute load imposed by either of drag bar 42 or link 60 upon the other; and threaded fastener means 68 provides a pivotal connection as between drag bar 42 and link 60. Structure of the side bar cross tie 72 or 76 is sufficient to substantially eliminate most instances of a drag bar 42 being pulled away from the chain 32 or 33, as can occur when a laterally imposed shock load is exerted on chain 32 or 33. The integral side wall 74 of the first embodiment of the cross tie 72 presents yet additional structure for this purpose.

What has been illustrated and described herein are two preferred embodiments of an anti-fatigue mounting mechanism. While the mounting mechanism of the present invention has been illustrated with reference to preferred embodiments, the present invention is not limited thereto. On the contrary, alternatives, changes or modifications may become apparent to those skilled in the art upon reading the foregoing description. Accordingly, such alternatives, changes and modifications are to be considered as forming a part of the invention insofar as they fall within the spirit and scope of the appended claims.

What is claimed is:

1. An anti-fatigue mounting mechanism for connecting a combine feeder drag bar to a chain of the feeder, comprising:

link means for pivotally connecting an end portion of said bar to a lateral side of said chain, said link means comprising an attaching chain link having a pair of laterally extending spaced integral ears for pivotal movement about a vertical axis;

means operatively positioned between the bar end portion and the link means for cushioningly distributing load within the region where the lateral side of the chain and the bar end portion are pivotally connected together; and cross tie means carried by the chain for pivotally connecting the bar end portion to an opposite lateral side of said chain;

including a threaded fastener means extending through said spaced integral ears, wherein the load distributing means comprises a spaced pair of elastomeric members which straddle the bar end portion, wherein the threaded fastener means pivotally mounts the bar end portion and the spaced pair of elastomeric members straddling the bar end portion to the attaching chain link between the ears thereof said cross tie means comprises a cross tie pivotally mounted on one of the ears of said chain link by the threaded fastener means.

2. The anti-fatigue mounting mechanism of claims 1 wherein the cross tie having an integral side wall overlying the opposite lateral side of said chain and pivotally connected thereto.

3. An anti-fatigue mounting mechanism for connecting a pair of combine feeder drag bars to a drive chain therebetween, comprising:

a pair of chain links for respectively pivotally connecting the end portion of each of the bars to a respective lateral side of said chain for pivotal movement about a vertical axis;

cushioning means operatively positioned between each one of the pair of bar end portions and the respective one of said chain links for resiliently distributing load within the region where pivotally connected together; and cross tie means for connecting the chain links together said cross tie means comprises a cross tie, pivotally mounted by a pair of threaded fastener means to the chain links.

4. The anti-fatigue mounting mechanism of claim 3 wherein the cushioning means comprises two spaced pairs of elastomeric members, one of the spaced pairs of elastomeric members straddling one of the bar end portions, the other one of the spaced pair of elastomeric members straddling the other one of the bar end portions, wherein one of the threaded fastener means pivotally mounts one of the bar end portions and one of the spaced pair of elastomeric members to and between a pair of spaced ears of one of the chain links and wherein the other one of the threaded fastener means pivotally mounts the other one of the bar end portions and the other one of the spaced pair of elastomeric members to and between a pair of spaced ears of the other one of the chain links.

5. An anti-fatigue mounting mechanism for connecting a combine feeder drag bar to a drive chain of the feeder comprising:

an attaching chain link having laterally extending ear means pivotally connecting an end portion of said bar to a lateral side of said chain for relative pivotal movement about a substantially vertical axis;

load distributing means operatively positioned between the bar end portion and said chain link ear means for resiliently distributing load within the region where the lateral side of the chain and the bar end portion are pivotally connected together; and cross tie means operatively connected to said attaching chain link and extending to an opposite lateral side of said chain for operative connection to another chain link opposite said attaching chain link; said cross tie means comprises a cross tie pivotally mounted on the chain link ear means by a fastener means.

* * * * *